United States Patent [19]

Emerson

[11] 4,331,033

[45] May 25, 1982

[54] PRECISION FLOWMETER

[75] Inventor: Reginald S. Emerson, Buckingham, England

[73] Assignee: Leslie Hartridge Limited, Buckingham, England

[21] Appl. No.: 152,689

[22] Filed: May 23, 1980

[30] Foreign Application Priority Data

May 31, 1979 [GB] United Kingdom ................. 7918898

[51] Int. Cl.³ ............................................. G01F 3/14
[52] U.S. Cl. .................................... 73/243; 73/119 A
[58] Field of Search ..................... 73/119 A, 239, 243, 73/246, 249; 222/71; 364/510

[56] References Cited

U.S. PATENT DOCUMENTS

| | | | |
|---|---|---|---|
| 7,869 | 1/1851 | Ericsson | 92/170 X |
| 3,344,667 | 10/1967 | Maltby | 73/239 |
| 4,192,185 | 3/1980 | Keilholz | 73/243 |
| 4,214,476 | 7/1980 | Koster et al. | 73/119 A |

Primary Examiner—Jerry W. Myracle
Attorney, Agent, or Firm—Berman, Aisenberg & Platt

[57] ABSTRACT

A precision positive displacement flowmeter for providing an accurate measurement of fluid flow at one end of a fluid circuit, comprising a cylinder and piston arrangement constructed to receive and emit circuit fluid continually, and an indicator arranged to give an indication of such flow by monitoring piston movement.

13 Claims, 4 Drawing Figures

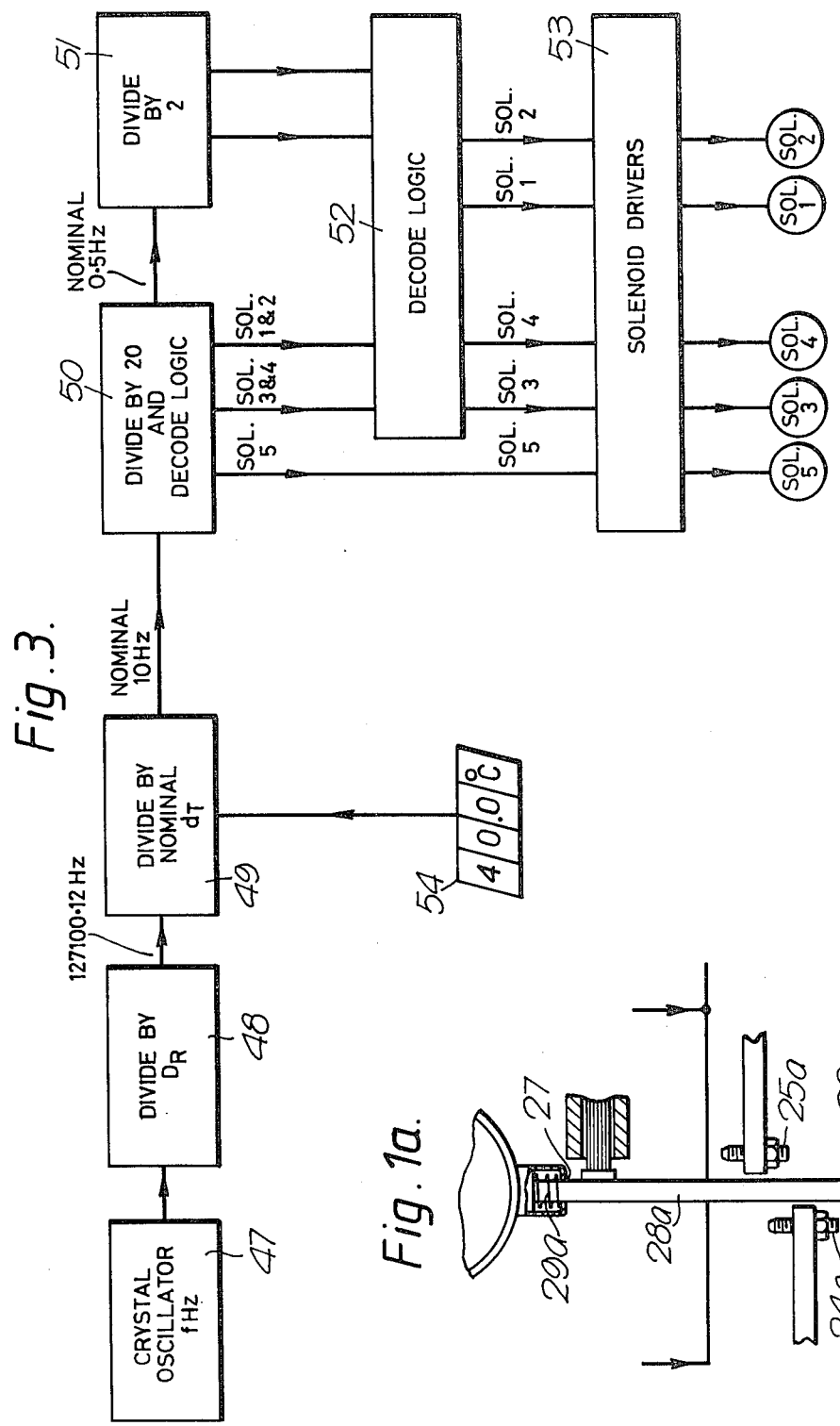

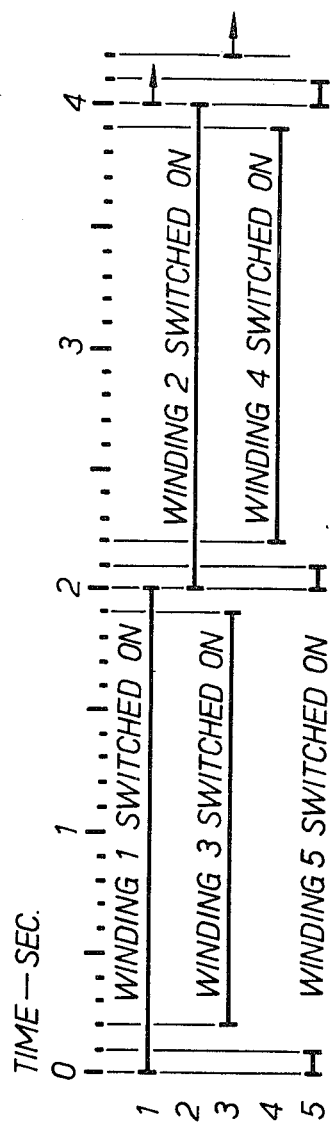

PRECISION FLOWMETER

The present invention relates to precision flowmeters, and has been devised primarily though not entirely for use with thin liquids of between 1 and 4 cSt. in systems where it is desired to measure flow rates of up to for instance 1000 gallons per hour (4500 l/hr), with an accuracy of better than 0.2% of reading in the range 20% to 100% of the maximum reading and where the flow can be measured at the inputs to or outputs from the circuits whose flows are to be measured.

With the above consideration in mind, the present invention is directed to a precision positive displacement flowmeter for providing an accurate measurement of fluid flow at one end of a fluid circuit, comprising a cylinder and piston arrangement constructed to receive and emit circuit fluid continually, and indicating means arranged to give an indication of such flow by monitoring piston movement.

A particularly accurate form of this flowmeter has two pistons in respective cylinders which operate alternately when the flowmeter is in use, with substantially no "dead" period between successive operations.

The indicating means may comprise one indicator connected to measure the displacement of more than one piston of the flowmeter. This gives an efficient use of components.

In one application of the flowmeter, it is used to feed fluid to the input of a fluid circuit. The fluid pressure to achieve this may be developed by means of a primary pump. A relief valve can also be provided to maintain a predetermined fluid pressure accurately.

Greater precision can be achieved by selectively adjusting the timing of successive operations of the flowmeter to correct for volumetric expansion of the fluid and/or the flowmeter itself.

A flowmeter in accordance with the present invention may be used in a test system for testing injectors of a fuel injection engine.

The fluid for the system may be supplied from a tank in which all entrained air is eliminated and where the temperature is stabilized at a constant value in the range of for example 30° to 50° C. with an accuracy of ±0.5° C., or better.

In one particular form of the invention, the flowmeter comprises two pistons each of the same precise diameter. The pistons each pass through stiff lip seals and lie close together on parallel axes. The lip seals face the same direction and divide each of two cylinder interiors, in which the two pistons are guided in the cylinder interiors by means of piston rods. Each piston divides the cylinder interior into a metering chamber and a chamber containing a biassing spring urging the piston towards the metering chamber. A primary pump draws fluid from the tank and delivers it to the inlet ports of two separate two-port spool valves. A relief valve maintains the pressure of the delivered fluid substantially constant at for example 10 p.s.i. and excess fluid passes through warming ducts in the cylinder housings and thence back to the tank. The outlet ports of the spool valves are each connected to one of the metering chambers. These chambers are also each connected to one of the inlet ports of a three-port double-solenoid-operated spool valve. The outlet port of this three-port valve delivers the metered fluid to the circuit.

The primary pump may be motor driven to draw fluid from the tank at a constant rate through a fine suction filter and to force it through the relief valve of the meter from which metered fluid will issue at a positive pressure of about 2 p.s.i. Excess fluid from the relief valve passes through the meter to maintain its temperature constant; it then returns to the tank.

The piston rods preferably extend through end faces of the spring chambers and carry radially disposed cantilevers each contacting the foot of a standard 4" diameter dial indicator. Adjustment screws in both cantilevers permit a setting so that each screw just contacts the dial indicator foot when the dial indicator reads zero and both pistons are against their end stops with their springs depressed. A spring loaded (and solenoid retractable) friction pad overcomes the dial indicator rack spindle return spring and enables a reading to be held.

The dial indicator can read flow rate directly in any desired units and with any desired sensitivity. The reading can be displayed continuously and updated every two seconds.

Using a microprocessor in conjunction with the dial indicator, or with a digital read-out instead of the dial indicator, the units of flow rate shown and the sensitivity can be selectively varied, and long term averaging is facilitated.

Thus it will be appreciated that a digital transducer, which may be electronic, could be used to monitor piston movement instead of a dial indicator.

An electronic crystal time base sequencing device can be used to operate the five solenoids of the meter in the required sequence which extends over, say, a four second cycle time (other cycle times are also possible for smaller or larger flowrates).

An example of a flowmeter in accordance with the present invention is illustrated in the accompanying drawings, in which:

FIG. 1a shows a modified form of the flowmeter shown in FIG. 1;

FIG. 2 is an explanatory timing diagram; and

FIG. 3 is a block circuit diagram of electronic timing circuitry of the flowmeter.

Figure 1:
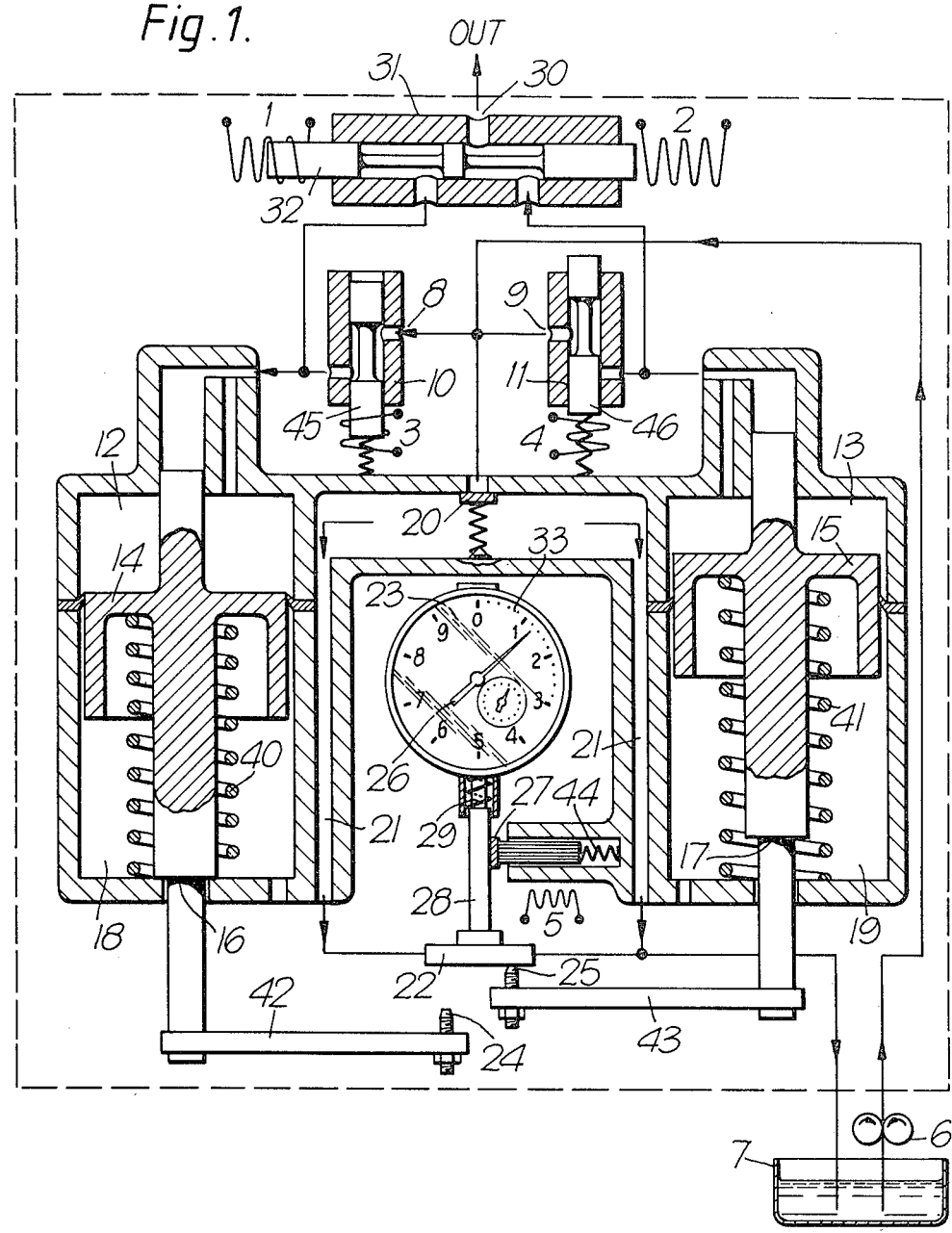
FIG. 1 is a diagrammatic axial sectional view of the flowmeter.

The flowmeter shown in FIG. 1 comprises a primary pump 6 which draws fluid, for example oil, from a tank 7 and delivers it to respective inlet ports 8 and 9 of solenoid operated valves 10 and 11. These valves open alternately and permit fluid under pressure to enter the metering chambers 12 and 13 forcing the pistons 14 and 15 downwardly against the action of their respective biassing springs 40 and 41 until the shoulders 16 and 17 contact the lower interior end faces of spring chambers 18 and 19. Further fluid delivered by the pump 6 then escapes back to the tank 7 through a relief valve 20 and warming ducts 21. At this stage the foot 22 of a standard dial test indicator 23 will be simultaneously contacting both of adjustable abutment studs 24 and 25 on radially extending cantilevers 42 and 43 connected to the piston rods of the pistons 14 and 15, and a pointer 26 will be indicating zero. A friction pad 27, under the action of a biassing spring 44, lies against a rod 28 of the indicator 23 to hold the momentary value indicated.

Timing circuitry, shown in FIG. 3, being preferably electronic in principle, operates windings 1,2,3, 4 and 5 in the sequence shown in FIG. 2. Windings 1 and 2 operate a three-port double-solenoid-operated spool valve 31, windings 3 and 4 respectively operate two solenoid-operated two-port spool valves 10 and 11, and the winding 5 operates the friction pad 27.

The positions of the components as illustrated in FIG. 1 occur at the point in time indicated by 1 sec in FIG. 2. At time "0" the winding 1 of the solenoid valve 31, and the winding 5 of the friction pad 27 are energised. At about 10 m.sec., the spool 32 of the valve 31 will have moved to the position illustrated in FIG. 1 and the pad 27 will have been retracted from the rod 28. A constant flow of fluid is now delivered via the discharge port 30 of the double-solenoid-operated valve 31. This is performed by means of the biassing spring 41 which begins to move the piston 15 so as to expel the fluid from the chamber 13 to the discharge port 30 so as to satisfy the demand of the ensuing circuit. The abutment stud 25 displaces the rod 28 and the pointer 26. After a time of, say, 0.1 sec., the winding 5 will have been de-energised allowing the pad 27 to exert a frictional force against the rod 28 by means of the spring 44. Nevertheless, the rod 28 will continue to move under the action of the greater force exerted by spring 41. After a further increment of 0.1. sec, the winding 3 is energised and the chamber 12 thus reconnected to the fluid supply at the standing pressure raised by the pump 6 and maintained at a suitable pressure by the valve 20 (approximately 10 p.s.i). Shoulder 16 thereby remains in contact with the interior end wall of the spring chamber 18. At time 1 sec., the components are substantially as illustrated in FIG. 1. At time approximately 1.9 sec., the winding 3 is de-energized and the spool 45 of the valve 10 locks the fluid inside the chamber 12. Approximately 0.1 sec. later, at precisely time 2 sec., the winding 1 is de-energized and the winding 2 is energized and, approximately 10 m.sec. later, (the time taken for spool 32 to slide towards the coil 2), the chamber 12 is put in communication with the discharge port 30 allowing the piston 14, under the action of its biassing spring 40, to continue the delivery of fluid from the discharge port 30. Thus the pistons are operated in turn with substantially no "dead" period between successive operations.

Any remaining fluid being now trapped in the chamber 13, the piston 15 becomes stationary so that the pointer 26 indicates the flow reading in any chosen units (such as gallons per hour) represented by the volume discharged from the chamber 13 in 2 seconds. At time 2.2 seconds approximately, the winding 4 is energized, bringing the chamber 13 into communication with the pump 6 to receive fluid therefrom so that the chamber 13 is refilled to bring the shoulder 17 once more into contact with the interior end wall of the spring chamber 19. At time 3.9 seconds approximately, the winding 4 is de-energized trapping the fluid inside the chamber 13. At time 4 seconds precisely (which is synonymous with time 0 from the point of view of the timing cycle), the winding 2 is de-energized and the winding 1 once more energized. At this point, the chamber 13 once more delivers fluid to the discharge port 30 as already explained. But the stud 24 will have risen to the vicinity of the foot 22. If the travel of the piston 14 was slightly in excess of the travel of the piston 15 immediately preceding, the stud 24 will already have displaced the foot 22 slightly more and no further movement of the foot will ensue when the winding 5 is momentarily energized. On the other hand, if the travel of the piston 12 was slightly less than that of the piston 13 immediately preceding, the stud 24 will have stopped short of the foot 22. But withdrawal of the friction pad 27 from the rod 28 for 0.1 sec. (between time 0 and time 0.1 sec.) will permit the foot 22 to drop onto the pad 24. Energising the coil 5 for this short period facilitates updating of the displayed reading on those occasions when the next reading is lower than the previous. This process is repeated every 4 seconds and the pointer 26 will continuously indicate the mean flowrate discharged over every 2 second period from the discharge port 30.

FIG. 3 shows electronic circuitry of the flowmeter which controls the operation of the solenoids of the spool valves and the friction pad 27. A quartz crystal oscillator 47 provides a signal of frequency $2^{22}$ Hz which is supplied to the input of a divider 48. This divides the crystal frequency by a value $D_R$ as defined hereinafter. The output from the divider 48 is fed to a further divider 49 which further divides the signal frequency by $d_T$ or approximately $d_T$, the value of which is also defined hereinafter. The actual value of the divisor $d_T$ is adjusted by means of thumbwheel switches 54 connected to a control input of the divider 48. The divisor is $d_T$ when the thumbwheel switches are set at 40.0° C. It is increased by one for a decrease of 0.1° C. in the temperature setting, and decreased by one for an increase of 0.1° C. The output signal from the divider 49 is at 10 Hz, or close to 10 Hz, and is passed on to division and decode logic circuitry 50 which has four outputs. One of these, which provides a signal of frequency 1/20th of the input frequency received by circuitry 50 (i.e. 0.5 Hz, or close to 0.5 Hz), is connected to an input of a divider 51 which divides the signal yet further by 2, and has two outputs connected to control inputs of decode logic circuitry 52. The other outputs from circuitry 50, one for solenoids 1 and 2 of the flowmeter and the other for solenoids 3 and 4, are also connected to inputs of circuitry 52. The fifth output from circuitry 50 passes directly to solenoid driving circuitry 53 for solenoid 5. Solenoids 1 to 4 are switched, via the decode logic circuitry 52 by the driving circuitry 53. Circuitry 50, 51 and 52 brings about the solenoid operation sequence illustrated in FIG. 2.

Important features for high accuracy of measurement in this mode of operation are:

1. The use of a storage tank to precondition the oil into a constant temperature, air free state before it flows into the oil circuit.

2. The use of a primary pump to circulate a surfeit of oil through the meter and back to the tank in order to guarantee a constant and controlled metering temperature, and also to maintain a low and positive pressure through the meter. This ensures that any leak to the exterior of the flowmeter is visible and that inaccuracies due to thermal expansion or physical compression are minimised. Diesel fuel injection systems test fluid expands at the rate of approximately 1% per 9° C.; this limits temperature error to ±0.056%. At low pressures, oil contracts at the rate of approximately 1% per 1000 p.s.i. The difference of approximately 8 p.s.i. between the charge pressure and discharge pressure therefore represents a volume change of 0.008% of the total volume in the metering chamber, or, say, 0.04% of a 20% of full scale reading. But this, together with distortion of the piston seal and expansion of the metal chambers due to the 8 p.s.i. change in pressure, can be negated by a correct setting of the abutment studs 24 and 25.

3. The flow measuring means is completely fundamental in principle, namely, it involves volume measurement by means of a piston of known diameter moving through a measured displacement during a predetermined time. The possible errors in a meter of range 20 to 100 g.p.h. can be limited to:

a. Piston diameter; 0.003 mm in 113.344 mm≡±0.006% in terms of area.
b. Piston stroke; 0.005 mm in 25 mm≡±0.02%.
c. Timing; over 2 sec×1: ±2 m. sec. (i.e. valve 31 consistency); over 2 sec×2: ±1 u. sec. (i.e. electronic clock accuracy)≡±0.1% from reading to reading or ±0.0001% overall mean error.

In terms of error at a 20% full scale reading, the above represents:

d. Piston diameter error produces a reading error proportional to the reading and therefore the error remains as ±0.006%.
e. Piston stroke measurement error could be a constant value irrespective of stroke; therefore this error at 20% of full scale reading could be ±0.1% (but with a more accurate transducer this could be comfortably reduced by ×10).
f. The time error produces a reading error proportional to the reading and therefore remains as in (c).

Overall, including temperature, these possible errors amount to:

g. At full scale reading: ±0.185% from reading to reading. ±0.0851% mean reading error.
h. At 20% of full scale: ±0.265% from reading to reading. ±0.1651% mean reading error, but ±0.1% of this is due to the use of a commercial quality dial indicator and would be reduced considerably.

4. Two measuring chambers operating alternately facilitate measurement of all the fluid all the time. This obviates errors due to imperfect valve function and timing. It also serves to indicate a malfunction in either half of the system.

5. Any leakage of a valve or seal is easily indicated by observation of the display after stopping the pump and closing all valves with the metering chambers initially filled.

6. The display is substantially continuous permitting on line adjustment to be made to the mechanism whose flow is being checked, measured or set.

The adjustment for deviation of measuring temperature from the designated temperature will now be described in greater detail.

It is intended that, in the foregoing mode of operation the flowmeter and its primary pump should constitute the first element in the circuit whose flow is to be measured. It is also anticipated that it will be necessary to control the fluid temperature closely at its source so that it achieves a precise temperature at a point downstream from the flowmeter. Furthermore, that there will be a pressurizing pump immediately following the flowmeter and before the place in the system where a precise temperature is required. In reaching this place heat is injected into the oil while at the same time heat is lost from the outside surfaces of the circuitry of the system. The precise temperature of the oil as it passes through the flowmeter is therefore dependent upon prevailing conditions. And, since this temperature bears an important (and above stated) relationship with the flow reading displayed by the meter, it must be measured accurately—to, say, ±0.1° C.

The circuitry for energizing the solenoid operated flow control valves in the correct sequence and at the appropriate moments in time, comprises a quartz crystal set in resonance at a precise frequency, the vibrations of which are counted and, at particular counts, initiate the necessary events. All the necessary events over each 2 second basic timing period occur at particular numbers of one tenth second increments. It is therefore convenient for the resonant frequency of the crystal to be such that a particular whole number of vibrations equates precisely to one tenth of a second (i.e. the preliminary count).

The meter is dimensioned so as to be accurate at a designated temperature—in this case 40° C. But if the oil passing through the meter is for instance at 43.1° C., it will be in an expanded state and the reading will be high by approximately 0.25%. To compensate for this condition and to ensure an accurate reading irrespective of the oil temperature, the basic timing period of the meter is adjusted in inverse ratio with expansion of the oil. This provision is readily made by setting up the required preliminary count of crystal vibrations by means of a set of thumbwheel decade switches.

It is even more convenient if (a) the thumbwheel switches are of the decimal type so that they can be arranged to adjust the count inversely with the selected number (i.e. so that an increase in the setting reduces the count) and (b) if the fundamental frequency of the crystal is selected so that the last digits coincide with the measured temperature of the meter.

The mathematics of the foregoing can be expressed by the following equations:

$\gamma = (\beta - \alpha) \times 100\%$ °C$^{-1}$
$t\gamma = \gamma \Delta B / 10 \times 100$ sec.
$d = \Delta B / t\gamma$
$D = ft\gamma$ which, rounded off, $= D_R$.
$d_T = f\Delta B / D_R$.
$E\gamma = 200\gamma(d - d_T)/d \%$.
$B_C = D_R d_T B / f \Delta B$ sec.

in which:

$\beta$ = Coefficient of cubic expansion of the fluid
$\alpha$ = Coefficient of cubic expansion of the components constituting the volume measurement system of the meter.
$\gamma$ = Effective volumetric expansion rate %.
$B$ = Time base for each piston movement.
$\Delta B$ = Time base increment.
$t\gamma$ = Incremental change in $\Delta B$ necessary to offset the effect of $\gamma$.
$D$ = Basic divider.
$D_R$ = D rounded off to the nearest whole number.
$T$ = Designated working temperature.
$d$ = Actual divisor at any given temperature (to nearest whole number).
$d_T$ = Adopted variable divisor at a designated temperature T (to nearest whole number).
$E\gamma$ = % Error in reading at T±20 due to incorrect allowance for $\gamma$.
$B_c$ = Corrected time base due to rounding off D and $d_T$.
$f$ = crystal natural frequency.

Examples of particular values are as follows:

$\beta = 8.225 \times 10^{-4}$ °C$^{-1}$
$\alpha = 0.351 \times 10^{-4}$ °C$^{-1}$
$B = 2$ sec.
$f = 4194304$ Hz (i.e. $2^{22}$ which is very popular in clock systems).
$T = 40$° C.

whence:

$\gamma = 0.07874\%$.
$t\gamma = 0.000\ 007\ 874$ sec.
$d = 12700$
$D_R = 33$
$d_T = 12710$
$E\gamma = \pm 0.0124\%$.
$B_c = 1.999\ 998$ sec.

Clearly, f must be chosen so that the difference between d and $d_T$ does not produce too great a difference between B and $B_c$. If this cannot be avoided, the piston diameter or piston displacement transducer must be suitably matched.

The following table illustrates the decade switch scale and its relationship to the code used to count inversely with the switch setting.

TABLE

| Hundreds | | Tens | | Units | |
|---|---|---|---|---|---|
| Scale | Code | Scale | Code | Scale | Code |
| 0 | 9 | 0 | 9 | 0 | 9 |
| 1 | 8 | 1 | 8 | 1 | 8 |
| 2 | 7 | 2 | 7 | 2 | 7 |
| 3 | 6 | 3 | 6 | 3 | 6 |
| 4 | 5 | 4 | 5 | 4 | 5 |
| 5 | 4 | 5 | 4 | 5 | 4 |
| 6 | 3 | 6 | 3 | 6 | 3 |
| 7 | 2 | 7 | 2 | 7 | 2 |
| 8 | 1 | 8 | 1 | 8 | 1 |
| 9 | 0 | 9 | 0 | 9 | 0 |
| Examples: | | | | | |
| 666 | 333 | 290 | 709 | 000 | 999 |
| 667 | 332 | 291 | 708 | 999 | 000 |
| 668 | 331 | 299 | 700 | | |
| 669 | 330 | 300 | 699 | 001 | 998 |
| 670 | 329 | 301 | 698 | 998 | 001 |
| 671 | 328 | | | | |
| | | 399 | 600 | | |
| 685 | 314 | 400 | 599 | | |
| 696 | 303 | 401 | 598 | | |
| 697 | 302 | | | | |
| 698 | 301 | 499 | 500 | | |
| 699 | 300 | 500 | 499 | | |
| 700 | 299 | 501 | 498 | | |
| 701 | 298 | | | | |

In cases where a certain fluid circuit has a fluid outlet at a positive pressure, a slightly modified form of the flowmeter, illustrated in FIG. 1a, may be used to measure the flow of fluid through the circuit by using fluid issuing from the outlet of the circuit.

The modifications are summarized as follows:

(1) The outlet of the fluid circuitry is connected to what was previously used as the outlet connection 30 in FIG. 1.

(2) The primary pump 6 is omitted, but both ducts to or from the tank remain.

(3) The structure of the flowmeter in the region of the indicator is modified as shown in FIG. 1a by extending the rod 28 to re-position foot 22 to contact the outside ends of studs 24 and 25. For this modified construction as shown in FIG. 1a, the rod has been labelled 28a, the foot as 22a, and the studs as 24a and 25a. Also the spring 29 becomes spring 29a for biassing the rod 28a in an upward direction to bring the foot 22a into contact with stud 24a and/or 25a. An internal adjustment in the indicator 23 ensures that the pointer 26 does not rotate in the wrong direction.

The modified flowmeter is used as follows:

With connection 30 open the spool 32 of valve 31 is shifted in both directions so that the metering chambers 12 and 13 are emptied as both pistons 14 and 15 are urged upwardly by their biasing springs 40 and 41 as far as they can physically travel. The studs 24a and 25a are then adjusted so that they are both in contact with the foot 22a and the dial gauge pointer is at the zero of its scale.

Fluid is now caused to enter the meter through the connection 30 with the spool 32 of the valve 31 at the left end of its travel in FIG. 1. The fluid passes, contra to the flow direction arrows by the valve 31 in FIG. 1, into the chamber 13 causing downward displacement of the piston 15 against its spring 41. As a result, the foot 22a is similarly displaced because of the cantilever 43, and the pointer of the dial gauge is correspondingly rotated.

At time 0.2 secs. from the first entry of fluid through the valve 31, the winding 3 is energized as shown in FIG. 2, thus ensuring that the piston 14 remains in its uppermost position urged by its spring 40. At time 1.9 secs the winding 3 is de-energized thus closing valve 45 and the metering chamber 12. At time 2.0 secs, the winding 1 is de-energized and the winding 2 is energized. The valve 32 is thereby reversed and the incoming fluid now passes through the connection 30 into the chamber 12, thus commencing to displace the piston 14 against the biasing of its spring 40. At the same time the piston 15 is arrested and the indicator 23, after de-energization of the winding 5, displays the position of the piston 15, thus indicating the fluid flow rate over the first 2 seconds. At time 2.2 secs, the winding 4 is energized and the spring 41 exhausts the fluid in the chamber 13 through the valve 46 and thence back to the tank.

Meanwhile the piston 14 is being displaced until, at time 4 secs, the spool 32 of the valve 31 is returned to its first position. Piston 14 will have moved either less than or more than the piston 15 and the indicator 23 will indicate this fact as previously explained in the first-described mode of operation. The function of the electronics and mathematics remains precisely as in that previous mode.

A flowmeter as illustrated in FIG. 1 may be provided with a conversion kit so that it can readily be modified to operate in the second mode.

A micro-processor electronic system may be used in place of the system illustrated in FIG. 3.

I claim:

1. A precision positive displacement flowmeter for providing an accurate measurement of fluid flow at one end of a fluid circuit, comprising:
   (a) a cylinder and piston arrangement constructed to receive and emit circuit fluid continually;
   (b) connection means provided on said cylinder and piston arrangement for connecting the latter to such a circuit;
   (c) indicating means adjacent to said cylinder and piston arrangement and arranged to monitor piston movement and to provide an indication thereof;
   (d) a moveable operating rod connected to said indicating means, movement of which rod determines the measurement displayed by said indicating means;
   (e) biassing means acting on said operating rod to urge the latter in an outward direction away from said indicating means; and
   (f) respective parts which are fixed to pistons of said cylinder and piston arrangement, these parts each being in connection with said moveable operating rod to push the latter inwardly on a fluid-emitting piston stroke.

2. A precision positive displacement flowmeter for providing an accurate measurement of fluid flow at one end of a fluid circuit, comprising:
   (a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof;

(d) a moveable operating rod connected to said indicating means, movement of which rod determines the measurement displayed by said indicating means;

(e) biassing means acting on said operating rod to urge the latter in an inward direction towards said indicating means; and (f) respective parts which are fixed to pistons of said cylinder and piston arrangement, these parts each being in connection with said moveable operating rod to push the latter outwardly on a fluid-receiving piston stroke.

3. A precision positive displacement flowmeter for providing an accurate measurement of fluid flow at one end of a fluid circuit, comprising:

(a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof:

(d) a moveable operating rod connected to said indicating means, movement of which rod determines the measurement displayed by said indicating means;

(e) biassing means acting on said operating rod to urge the latter in a given direction, and (f) a solenoid operated friction pad adjacent to said operating rod to hold the latter in position against the action of said biassing means.

4. A precision positive displacement flowmeter for providing an accurate measurement of fluid flow at one end of a fluid circuit, comprising:

(a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof;

(d) cylinders and pistons of said cylinder and piston arrangement defining fluid receiving spaces; and (e) respective helical springs arranged to urge said pistons towards said fluid receiving spaces.

5. A precision positive displacement flowmeter for providing an accurate measurement of fluid flow at one end of a fluid circuit, comprising:

(a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof;

(d) solenoid operated spool valves connected to said cylinder and piston arrangement to control receiving and emitting of circuit fluid by and from said cylinder and piston arrangement; and (e) a three-port solenoid-operated spool valve of said solenoid-operated spool valves, having one port connected to such a fluid circuit when the flow meter is in use and its other two ports connected to respective cylinders of said piston and cylinder arrangement, to control flow of fluid between the latter and the fluid circuit.

6. A precision positive displacement flowmeter for providing an accurate measurement of fluid flow at one end of a fluid circuit, comprising:

(a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof; and (d) adjustment means arranged to selectively adjust the timing of successive operations of said flowmeter to correct for volumetric expansion of the fluid and/or the flowmeter itself, the adjustment means having a digital control which can be set manually.

7. A flowmeter according to claim 6, further comprising a temperature transducer in communication with fluid spaces in said flowmeter, said adjustment means being connected to said temperature transducer via electronic processing means to be controlled thereby.

8. A flowmeter according to claim 6, in which the adjustment means comprise an electronic control on the count of electronic timing pulses.

9. A precision positive displacement flowmeter for providing an accurate measurement of fluid flow at one end of a fluid circuit, comprising:

(a) a cylinder and piston arrangement constructed to receive and emit circuit fluid continually;

(b) connection means provided on said cylinder and piston arrangement for connecting the latter to such a circuit;

(c) indicating means adjacent to said cylinder and piston arrangement and arranged to monitor piston movement and to provide an indication thereof; and (d) cantilevers provided on said cylinder and piston arrangement to operate said indicating means.

10. A precision positive displacement flowmeter for providing an accurate measurement of fluid flow at one end of a fluid circuit, comprising:

(a) two pistons and respective cylinders defining two fluid-receiving spaces of variable volume;

(b) respective spring-biassing means positioned to urge said two pistons in a direction which reduces the volume of said fluid-receiving spaces;

(c) control valve means connected to said cylinders to control receiving and emitting of circuit fluid by and from said cylinders;

(d) connection means provided on said control valve means for connecting the latter to such a circuit;

(e) a three-port change-over valve of said control valve means having two ports connected respectively to said cylinders for passage of fluid selectively between one or other of the said cylinders and the third port of said three-port change-over valve;

(f) timing means connected to said three-port change-over valve to change the latter over regularly, with substantially no "dead" period; and (g) indicating means adjacent to said cylinders and arranged to monitor piston movement and to provide an indication thereof, whereby measurement of such flow is given.

11. A flowmeter according to claim 10, further comprising two two-port valves, one for each cylinder, each having one port connected between the cylinder and said three-port changeover valve, said timing means also being connected to each two-port valve to open the latter when the associated cylinder is closed to said third-port by said three-port change-over valve.

12. A flowmeter according to claim 10, further comprising an upper stop and a lower stop for each piston, and fluid-exhaust means connected to the other ports of said two-port valves, said timing means being connected to open each said fluid-receiving space to said fluid-exhaust means to permit the return of each piston, due to the force of its spring biassing means, until it reaches its upper stop.

13. A flowmeter according to claim 10, further comprising an upper stop and a lower stop for each piston, and pressure means connected to the other ports of said two-port valves, the said timing means being connected to open each said fluid-receiving space to said pressure means to return each piston, against the force of its spring biassing means, until it reaches its lower stop.

* * * * *